United States Patent [19]

Takata

[11] Patent Number: 5,031,968
[45] Date of Patent: Jul. 16, 1991

[54] ELECTRONICALLY CONTROLLED BRAKE DEVICE

[75] Inventor: Koji Takata, Itami, Japan

[73] Assignee: Sumitomo Electric Industries, Ltd., Osaka, Japan

[21] Appl. No.: 498,743

[22] Filed: Mar. 26, 1990

[30] Foreign Application Priority Data

Mar. 25, 1989 [JP] Japan ................................. 1-73557

[51] Int. Cl.$^5$ .................. B60T 7/00; B60T 13/70; B60T 15/14
[52] U.S. Cl. ........................... 303/15; 60/545; 60/582; 188/345; 188/359; 303/50; 303/100; 303/101; 303/110; 303/119
[58] Field of Search .................. 303/15, 50-56, 303/113, 114, 116, 119, 100, 101, 93, 110, 97, 96, 98, 99, 13-14, 16; 188/358, 359, 345, 181 C, 181 A; 60/545, 547.1, 550, 582, 553, 566, 581; 91/391 R; 180/197

[56] References Cited

U.S. PATENT DOCUMENTS

| | | | |
|---|---|---|---|
| 3,790,225 | 2/1974 | Wehde | 303/93 X |
| 4,131,325 | 12/1978 | Bayliss | 303/93 |
| 4,327,414 | 4/1982 | Klein | 303/93 X |
| 4,435,021 | 3/1984 | Hoenick | 303/119 X |
| 4,576,417 | 3/1986 | Dobner | 60/545 X |
| 4,603,918 | 8/1986 | Leiber et al. | 188/359 X |
| 4,610,484 | 9/1986 | Amberg et al. | 303/100 |
| 4,818,038 | 4/1989 | Ocvirk et al. | 303/119 |
| 4,826,255 | 5/1989 | Volz | 303/114 X |
| 4,940,291 | 7/1990 | Sato | 303/15 |
| 4,950,028 | 8/1990 | Harrison | 303/113 X |

*Primary Examiner*—Douglas C. Butler
*Attorney, Agent, or Firm*—Wenderoth, Lind & Ponack

[57] ABSTRACT

An electronically controlled brake device for controlling a brake pressure according to a manual input. While the dynamic pressure line is functioning normally, the dynamic pressure acts on one end of a push rod associated with a brake pedal to give such a force as to counteract the control input to the brake pedal. If the dynamic pressure line fails, the push rod comes into contact with a dynamic pressure piston to transmit the control input force to a master cylinder. An electronic pressure control valve is provided to adjust the connection of the dynamic pressure source with a reservoir and with a dynamic pressure chamber in response to the commands of an electronic control unit so that its output pressure will be in a predetermined relationship with the pedal stroke. Thus in normal conditions, a desired deceleration is obtained with a shorter pedal stroke and in the failure of dynamic pressure, a minimum deceleration is obtained with a lighter pedal force.

28 Claims, 2 Drawing Sheets

ELECTRONICALLY CONTROLLED BRAKE DEVICE

The present invention relates to an electronically controlled brake device for braking an automobile.

With the spread of antilock systems, electronically controlled brakes are required which have more sophisticated functions. But any of the conventional brake device of this type has demerits one way or another though it may have some merits. Namely, among conventional systems, many of them satisfy some of the below-described requirements, but there is none which satisfies all of them. Those requirements are:

(1) that minimum deceleration can be obtained manually (e.g. more than 0.3 g with a treading force of 50 kilograms) even if the dynamic pressure line or the electronic control line should fail;

(2) that a desired deceleration can be obtained with a light treading force and with a sufficiently short pedal stroke when the dynamic pressure line and the electronic control line are normal;

(3) that besides antilock function, the function of traction control, which is one form of automatic brake, can be provided with a minimum addition of cost.

(4) that the relation among the treading force, the pedal stroke and the deceleration can be easily set in any desired manner including a non-linear one; and (5) that the number of component parts is as small as possible and the system is less expensive and highly reliable.

As to the requirements (1) and (2), if the pressure of at least one line is controlled statically by use of a master cylinder having a fixed effective sectional area, it will become impossible to satisfy both requirements at the same time merely with a slight increase in the total weight of the vehicle.

If in order to satisfy the requirements (1) and (2), the master cylinder is so designed that its effective sectional area while the system is normal will be different from that when the system has failed, the number of parts will increase and thus the requirement (5) will not be met.

As to the requirement (4), it will be easy to electronically control the relationship between the deceleration and either one of the treading force and the pedal stroke. But in many conventional systems, the relation between the treading force and the pedal stroke is controlled mechanically. With such an arrangement, it would be difficult to satisfy both the requirements (1) and (2). In other words, even if the relation between the treading force and the deceleration can be satisfactorily controlled, it is difficult to control the stroke-deceleration relation and at the same time to satisfy the requirement (1). Even if both of these requirements are to be satisfied, the requirement (5) would not be met.

As one solution to these problems, it has been proposed to control the relation between the treading force and the pedal stroke by use of a spring. In this arrangement, the requirement (4) is met. But it is necessary to provide means for removing the reaction force of the spring in case the dynamic pressure line should fail, in order to prevent the function of (1) from declining owing to the reaction force of the spring. (Such means is disclosed e.g. in Japanese Patent Unexamined Publication 61-163050 by the present applicant). Thus it is sufficient to satisfy the requirement (5).

In U.S. Pat. No. 4603918, it is proposed to use a cam-and-lever arrangement to control the pedal stroke and the fluid pressure in any desired manner. But this system has a drawback that the reaction force of a spool valve is transmitted to the cam-and-lever mechanism, causing a friction loss. This will impair smooth control. Another problem with this prior art is that if the dynamic pressure line should fail, a considerable amount of the push rod stroke will become invalid.

It is an object of the present invention to provide a brake device which satisfies all of the above-described requirements (1) to (5) simultaneously.

The brake device according to the present invention has its basic and additional features, which will be described below.

basic features

The master cylinder has such a diameter as to satisfy the requirement (1). The dynamic pressure line has such a structure as to satisfy the requirements (2) and (4).

In the dynamic pressure line, the stroke of the control input end or the stroke of a member (such as the push rod) coupled with the control input end is detected and the pressure in the dynamic pressure line is electronically controlled so as to be in a predetermined relationship with the stroke detected. For this control the push rod and the master cylinder are adapted to operate independently of each other. The control stroke will be hereinafter referred to as pedal stroke because the control input end is usually a pedal.

additional features or considerations (a) Two static pressure lines may be provided by use of a tandem master cylinder or only one static pressure line may be provided whereas dynamic pressure is supplied to the other line. If two static pressure lines are used, the dynamic pressure may be used only as booster pressure for the static pressure lines or there may be provided three lines, two static pressure lines and one dynamic pressure line.

(b) Either of the brake pressure (such as the pressure in the dynamic pressure line) and the deceleration may be used as target characteristic which corresponds to the pedal stroke (it is the pedal stroke associated with the push rod stroke that affects the actual feeling even if the detection is made in terms of the push rod stroke).

If the deceleration is employed, there will be no need for a fluid pressure sensor and thus the system will enjoy a large cost reduction. The control characteristics may be adapted to be variable with the speed. Especially if the control is carried out based on the stroke and the deceleration, it is essential that the system have a special control mode for preventing the pedal from being pushed back when the vehicle is at a stop and an intermediate control mode (in travelling at a low speed) for allowing a smooth transition to the special control mode. Such non-linear characteristics can be changed in any desired manner by changing the program in the electronic control unit.

But according to the present invention, because the pressure in the dynamic pressure line is applied to the pedal as a reaction force, the relation between the treading force and the pressure in the dynamic pressure line is determined by the area of the push rod for receiving the pressure in the dynamic pressure line (and the pedal ratio).

(c) Because the electronic control is carried out by detecting the pedal stroke, if the electronic control line should fail, the dynamic pressure line might fail, too, even if the dynamic pressure source is normal. In this state, only the static pressure line is functioning. In order to avoid such trouble and to retain among the requirements (2) and (4), the advantage that the treading force can be kept small, while abondoning the advantage that the stroke can be kept short, even if the electronic control line fails, a pure mechanical control valve may be further provided to add the function of an ordinary fluid pressure booster. But the attendant increase in the cost will make it difficult to satisfy the requirement (5).

(d) Any desired type of antilock device may be used to satisfy the requirement (3).

In one method for increasing pressure after pressure reduction, the pressure fluid in the dynamic pressure line is fed into the static pressure line as a pressure source. In another method, it is not mixed into the static pressure line.

The latter method is superior from the viewpoint of safety. But it requires a piston for expansion if an expansion type is employed to re-increase pressure. If a circulation type is employed, it requires a reservoir for temporarily storing fluid and a pump therefor besides the reservoir and the pump for the dynamic pressure source. This will make it difficult to satisfy the requirement (5).

In contrast, the method wherein the dynamic pressure is supplied into the static pressure line can attain the requirement (5) more easily. But with this method, it is necessary to stop the antilock function in case of a failure in the dynamic pressure line. Also it is necessary to stop the fluid flow from the dynamic pressure line to the static pressure line in case of a failure in the static pressure line. One effective means for detecting failure in the static pressure line is disclosed in Japanese Patent Application 1-44526 by the present applicant. There are other known methods for electrically detecting failure. The decision on which one to select should be made with the requirement (5) taken into consideration.

(e) The automatic brake systems such as a traction control system are all electronically controllable. Thus they can be controlled in any desired manner simply by changing the control program without the necessity of providing any additional mechanical components.

But if an ordinary fluid pressure booster mechanism is used, it will be difficult to apply brakes automatically with such electronic control methods as the one in which the boost pressure is controlled directly and the one in which the pressure in the dynamic pressure source is supplied into a valve mechanism for the fluid pressure booster in a controlled manner. Thus the method in which the backpressure toward the reservoir is controlled should be adopted.

(f) If the system comprises one static pressure line and one dynamic pressure line, the effective sectional area of the master cylinder for satisfying the requirement (1) is small and thus the pedal stroke at the time of failure in the dynamic pressure line is large. Especially if the dynamic pressure line should fail during braking, the pedal stroke tends to be excessively large if the driver tries to keep the current deceleration level. Thus it is preferable that the distance between the master cylinder and the push rod in normal conditions be as short as possible. For this purpose, fluid should be supplied from the dynamic pressure line to the static pressure line not only during the antilock control but also in the normal state. But in such a case, it is necessary to provide means for detecting failure in the static pressure line in order to stop the pressure fluid from flowing into the static pressure line from the dynamic pressure line in case of failure in the static pressure line. The structure shown in FIG. 2 meets this requirement. Also the structure disclosed in the Japanese Patent application 1-44526 by the present applicant is also applicable because if the dynamic pressure is supplied to the static pressure line, the supplement of fluid during antilock control is also provided by the dynamic pressure line.

(g) The pressure control valve for adjusting the pressure in the dynamic pressure line is required to operate as smoothly as possible so as not to give any uncomfortable vibrations to the brake pedal. In this respect, a fluid pressure controller disclosed in Japanese Patent Application 63-288085 filed by the present applicant will be applicable to the device according to the present invention. It is especially suitable for use as the electronic pressure control valve in the dynamic pressure line. This type of control valve can be used as an antilock or a traction controller for separately controlling the wheels as recited in claim 2 of the same application.

Other features of the present invention will become apparent from the following description taken with reference to the accompanying drawings, in which:

FIG. 1 shows the basic embodiment of the present invention.

Figure 1:
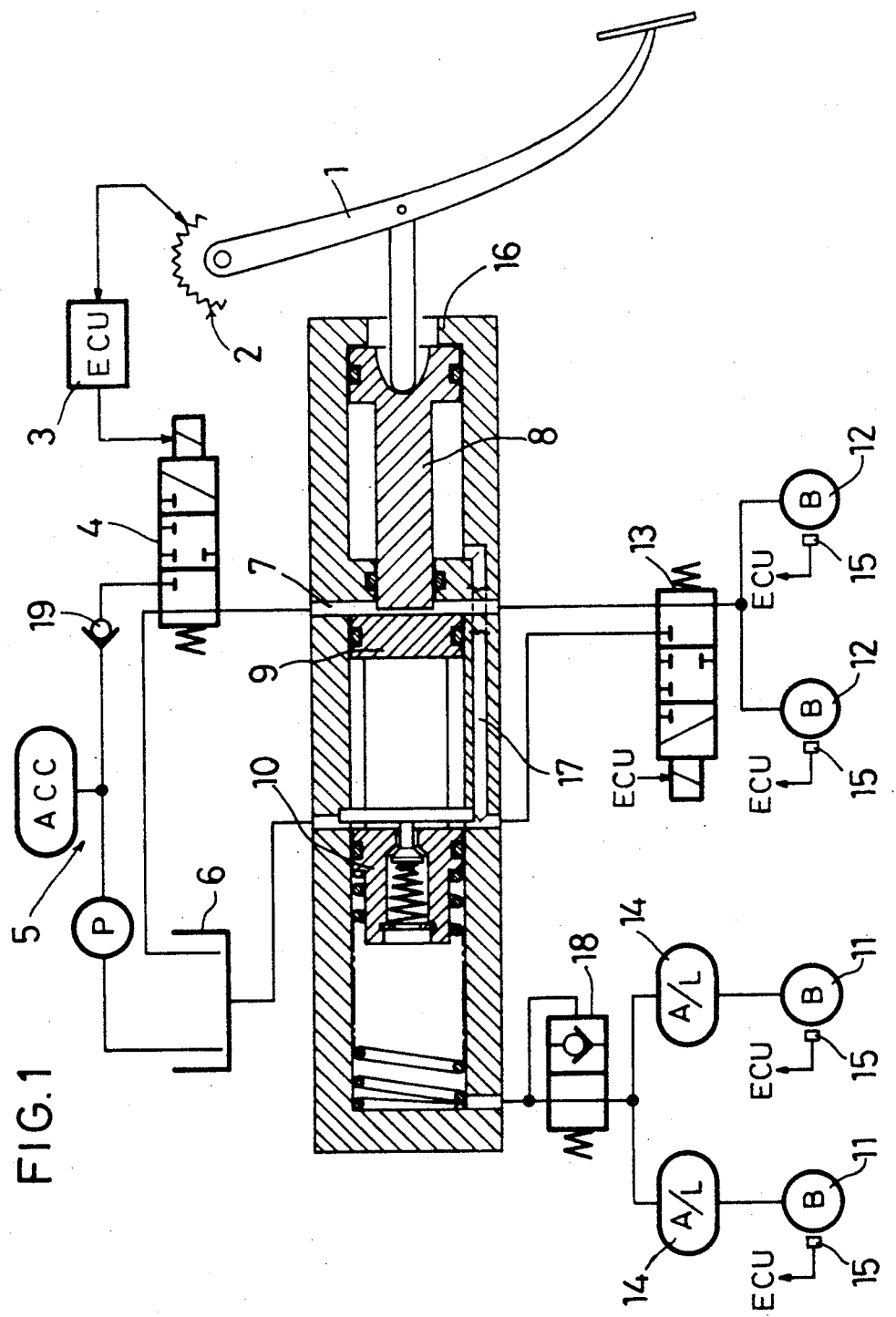
FIG. 1 is a sectional view of the first embodiment of the present invention.

The movement of a brake pedal 1 is detected by a stroke detector 2 such as a potentiometer and conveyed as stroke signals to an electronic control unit 3, which gives drive commands based on the sensor information including the stroke signals to a pressure control valve 4, which in turn controls communication between a dynamic pressure source 5 and a reservoir 6 and a dynamic pressure chamber 7 to feed a desired pressure to the dynamic pressure chamber 7.

The dynamic pressure fed to the dynamic pressure chamber 7 is transmitted through a push rod 8 to the pedal 1 to act as a counterforce to the force for depressing the pedal 1 on the one hand and acts on a dynamic pressure piston 9 on the other hand.

As the dynamic pressure piston 9 is pushed, a master cylinder piston 10 integral with the piston 9 moves together with it. As a result, static pressure is produced in a master cylinder, which transmits it to brakes 11 in the static pressure line.

On the other hand, the dynamic pressure is transmitted through the dynamic pressure chamber 7 to brakes 12 in the dynamic pressure line. The pistons 9 and 10 may have the same diameter or have slightly different diameters from each other.

The device of this embodiment is provided with a stopper 16 to restrict the backward stroke of the push rod 8. It may be provided not on the device itself but on the pedal. For easiness of manufacture, the push rod 8 should have an increased diameter at its end for coupling with the pedal 1 as shown.

Seals are fitted on the outer periphery of the push rod 8 to liquid-tightly seal the dynamic pressure chamber 7. A liquid-filled passage 17 leading to the reservoir 6 should preferably be formed behind these seals to protect them. Of course it may be omitted to reduce the production cost.

To use this device for antilock brake control, a two-position or three-position valve 13 should be provided in the dynamic pressure line to discharge the brake fluid in the brakes directly into the reservoir 6 during the pressure reduction phase and to feed the brake fluid in the dynamic pressure line directly into the brakes during the pressure reapplication phase. The brakes in the dynamic pressure line may be controlled with a single control valve as in the preferred embodiment or separate control valves may be provided for the respective brakes.

Figure 2:
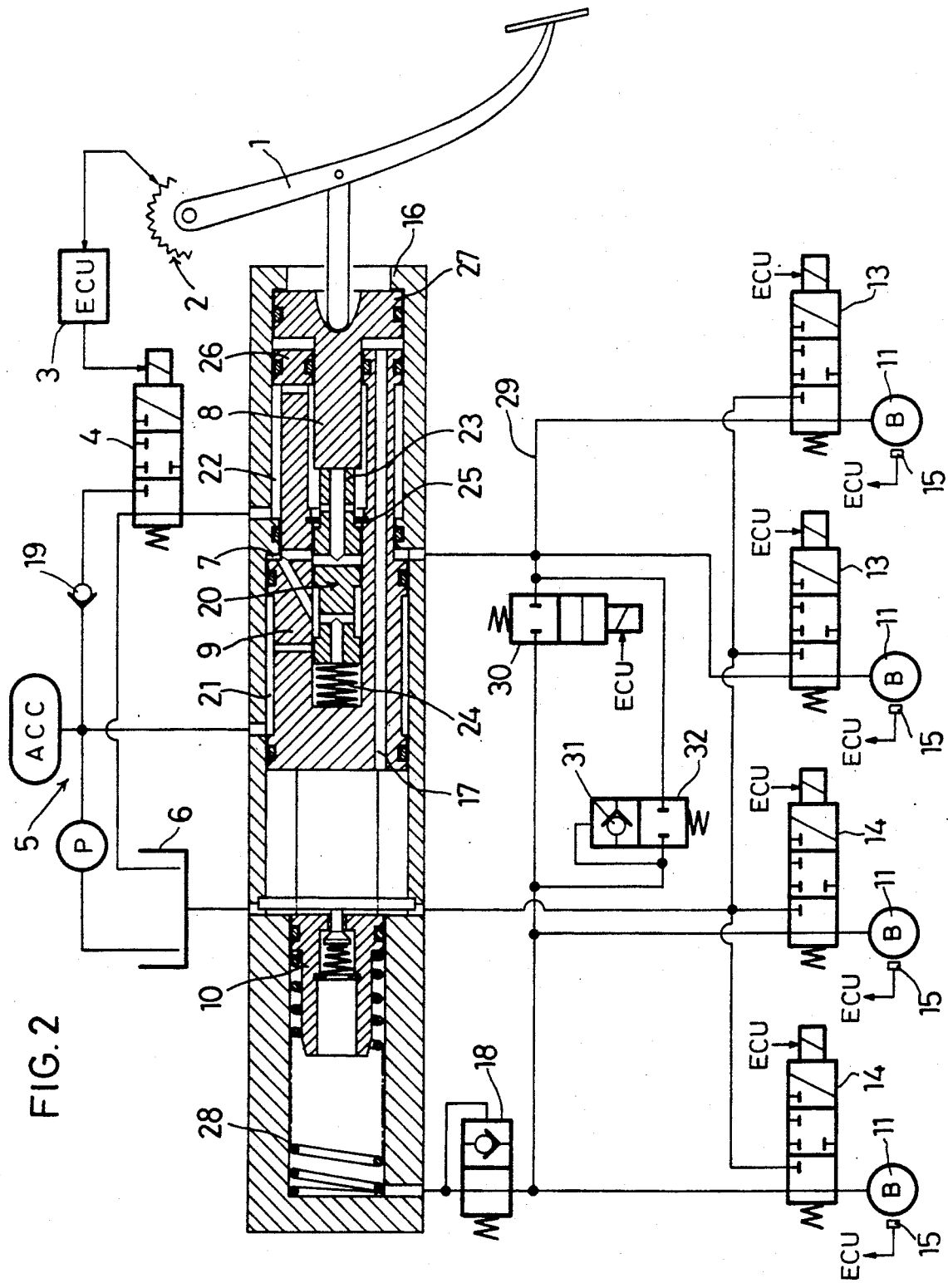
FIG. 2 is a sectional view of the second embodiment.

In the preferred embodiment, antilock devices 14 of an extending type or a circulating type are provided in the static pressure line to control the static pressure line and the dynamic pressure line separately from each other. If an extending type is used, its extension piston may be controlled by use of the pressure of the dynamic pressure source or the pressure in the dynamic pressure line obtained by adjusting the pressure of the dynamic pressure source. The antilock devices in the static pressure line may be so adapted that the pressure re-increase is carried out by replenishing the brake fluid from the dynamic pressure line. An example of such an arrangement is shown in FIG. 2.

In order for the antilock devices to function, it is necessary to provide each vehicle wheel with a wheel speed sensor 15. The electronic control unit 3 calculates the acceleration or deceleration speed of the vehicle based on the signals from the wheel speed sensors 15 and compares the results of calculation with the signals from the stroke detector 2 to give pressure control commands to the pressure control valve 4.

As described above, other sensors than the wheel speed sensors may be added so as to allow the electronic control unit 3 to perform other functions than simply estimating the vehicle speed based on the signals from the wheel speed sensors 15. Such sensors include one for directly detecting the acceleration and deceleration speed of the vehicle, one for directly detecting the speed of the vehicle against ground, one for detecting the pressure in the dynamic pressure line and one for detecting the supply voltage. They all serve to improve the accuracy of control.

Sensors capable of detecting failure are also useful. Such sensors include a stroke sensor for a master cylinder piston, a sensor for detecting the pressure in the static pressure line and a sensor for detecting the pressure in the dynamic pressure line.

Further, such sensors as one for detecting whether the vehicle is moving in the forward or reverse direction, one for detecting the gear position, an accelerator pedal stroke sensor and one for detecting the degree of opening of an engine throttle may be added. The selection of sensors should be made with the cost of the entire device taken into consideration.

With traction control, the driven wheels are braked with a desired force while there is no manual input (treading force or pedal stroke). Thus the device according to the present invention can perform traction control simply by providing a wheel speed sensor for each wheel. The provision of a sensor for detecting the acceleration and deceleration speed of the vehicle would be especially useful in improving the controllability. So is a fluid pressure sensor.

According to the present invention, a desired pressure is produced in all the lines by controlling the electronic control unit 3. In order to apply brake pressure only to the driven wheels, the brake pressure on the non-driven wheels has to be kept at zero. For this purpose, it is required that the control valve be of a type having a pressure hold position (where the fluid pressure is sealed) whether the non-driven wheels are in the static pressure line or in the dynamic pressure line.

The device according to the present invention can also be used to hold the vehicle at a stop (to start a manual-transmission car on an upward slope or to prevent the creeping of an automatic control car) by providing suitable sensors and adding a suitable program to the program in the electronic control unit.

The master cylinder piston 10 according to the present invention should have such a sectional area that the treading force will not get excessively large even in case the dynamic pressure piston 9 is pressed directly by the push rod 8 owing to a failure in the dynamic pressure line. Therefore, the strokes of the dynamic pressure piston and the master cylinder piston are larger than the pedal stroke and thus the push rod stroke in normal conditions. Thus as far as the brakes are working normally, the push rod 8 and the dynamic pressure piston 9 are set apart from each other with a clearance corresponding to the pressure at that time.

On the other hand, the effective pressure receiving area of the push rod 8 is determined by the brake fluid pressure, i.e. depending on approximately how much counterforce or treading force should be imparted on the pedal in relation to the deceleration. In normal conditions, the treading force or the pedal feeling is determined by the sectional area of the push rod 8 and the pedal stroke is determined by an electronic control program (capable of imparting any given non-linear characteristics easily). Thus the sectional area of the master cylinder piston 10 will have no influence on the pedal feeling whatsoever in normal conditions.

But because the master cylinder has a relatively small diameter, if an unnecessarily large treading force is applied to the pedal, an abnormally high static pressure might be produced. The static pressure line might be influenced unfavorably by such high static pressure. In order to avoid this problem, it is preferable to provide a limit valve 18 adapted to be actuated by the pressure at the upstream or downstream thereof if the pressure in the static pressure line should exceed a predetermined lower limit of the pressure of the dynamic pressure source so as to prevent the hydraulic fluid from flowing from the master cylinder to the brakes 11.

The device shown in FIG. 2 has an ordinary pure mechanical valve mechanism and has an additional function as a fluid pressure booster. Although this figure illustrates an example in which hydraulic fluid is supplied from the dynamic pressure line to the static pressure line, the above two features may be embodied separately from each other.

In the embodiment of FIG. 2, the dynamic pressure piston 9 has a larger diameter than the one shown in FIG. 1. It has a spool valve mechanism 20 mounted therein and is formed in its outer periphery with a high-pressure inlet 21 and a low-pressure inlet 22.

The high-pressure inlet 21 serves to transmit the fluid pressure generated in the dynamic pressure source 5 to the spool valve mechanism 20 whereas the low-pressure inlet 22 serves to transmit the pressure adjusted according to the commands from the electronic control unit 3, i.e. the output fluid pressure from the pressure control valve 4 to the spool valve mechanism 20. The latter serves to switch the supply source of dynamic pressure from the pressure control valve 4 to the dynamic pressure source 5 if a spool 23 mounted therein moves over a predetermined distance relative to the dynamic pressure piston 9.

Namely, with this device, as far as the dynamic pressure source 5 and the electronic control unit 3 are working normally, the latter actuates the pressure control valve 4 according to the stroke detected by the pedal stroke detector 2 so as to supply the adjusted dynamic pressure from the pressure control valve 4 to the dynamic pressure chamber 7 through the low-pressure inlet 22. In this state, if the fluid pressure is the same, the stroke in the static pressure line (that is, the stroke of the dynamic pressure piston) determined by the effective sectional area of the master cylinder piston 10 is larger than the pedal stroke (that is, the stroke of the push rod 8), which is the input of the electronic control. Thus the push rod 8 is kept apart from the valve mechanism 20, so that the spool 23 in the spool valve mechanism is pressed against a stopper 25 by the action of a spring 24. In this state, the relative position between a passage formed in the spool 23 and a passage in the dynamic pressure piston 9 is such that the dynamic pressure chamber 7 is out of communication with the high-pressure inlet 21 which is under the influence of the fluid pressure of the dynamic pressure source and is in communication with the low-pressure inlet 22 leading to the pressure control valve 4.

If the electronic control unit 3 fails while the dynamic pressure source 5 is functioning normally, the pressure control valve 4 will open communication between the reservoir 6 and the low-pressure inlet 22 by the action of a spring therein (FIG. 2 shows this state). In this state, the fluid pressure which acts on the push rod 8 as a reaction force is at zero. Thus the push rod 8 pushes the spool 23 directly. The spool thus pushed is moved to the lefthand side of the drawing. On the other hand, the dynamic pressure piston 9 is kept at a standstill because the pressure in the hydraulic pressure chamber 7 is at zero at the beginning of this movement and a return spring in the master cylinder has a larger force than the return spring 24 for the spool 23. Thus a large relative movement will occur between the piston 9 and the spool 23, which never occurs in a normal condition. This will cut off communication between the low-pressure inlet 22 and the high-pressure inlet 21, while opening communication between the dynamic pressure chamber 7 and the high-pressure inlet 21. As a result the hydraulic fluid in the dynamic pressure source 5 is fed into the dynamic pressure chamber 7. Also this pressure acts on the left end of the spool 23 and is transmitted through the push rod 8 in abutment with the spool 23 to the pedal 1 as a counterforce to the operating force. It is needless to say that the spool 23 is kept apart from the stopper 25 in this state.

Thereafter the spool 23 serves to bring the dynamic pressure chamber 7 into communication with the high-pressure inlet 21 or the low-pressure inlet 22 leading to the reservoir 6, depending upon the relation between the treading force applied to the pedal and the reaction force resulting from the dynamic pressure. In other words, the function as an ordinary fluid pressure booster is fulfiled even if the electronic control unit fails.

With this device, it is possible to set the sectional area of the spool 23 and that of the push rod 8 to such values that the relation between the treading force and the fluid pressure (or the deceleration in an approximate sense) is kept unchanged whether the electronic control unit is malfunctioning or not. But the pedal stroke can be shortened only if the electronic control unit is working normally.

If the dynamic pressure source 5 should fail, the push rod 8 will directly push the dynamic pressure piston 9 through flanges 26 and 27 to increase only the pressure in the static pressure line. In this state, not only the effect of shortening of the pedal stroke but also the effect of reduction in the treading force and the dynamic pressure will be all lost. If the dynamic pressure line is connected to a single line, the braking force in this line will be lost, too.

Next let us describe how the hydraulic fluid is supplied from the dynamic pressure line to the static pressure line.

As described in item (f), if the system has one static pressure line and one dynamic pressure line, it is preferable to replenish hydraulic fluid from the dynamic pressure line to the static pressure line not only during antilock control but also in a normal condition, to shorten the distance between the master cylinder piston, i.e. the dynamic pressure piston and the push rod. In replenishing fluid from the dynamic pressure line to the static pressure line, the following four cases should be taken into consideration.

(a) no supply of fluid allowed during failure of the dynamic pressure line
(b) no supply of fluid allowed during failure of the static pressure line
(c) supply of fluid permitted during antilock control in the static pressure line with a small treading force
(d) reversal of fluid flow permitted if the deceleration gets excessive compared with the pedal stroke Of the four considerations, (a) is a preventive measure against leakage of fluid from the static pressure line, (b) is a preventive measure against leakage of fluid from the dynamic pressure line and (c) is to allow the antilock control to function normally even if the pressure in the static pressure line is considerably low.

(d) is necessary for the following reason: if during a normal condition, the pressure on the pedal 1 is relaxed after pushing back the master cylinder piston 10 and the dynamic pressure piston 9 toward the push rod 8 by supplying fluid from the dynamic pressure line, a large amount of fluid tends to flow back from the brake lines because the rigidity of the static pressure line is low; as a result, during the backward stroke of the pedal, its stroke tends to be too large compared with the stroke-deceleration relation, i.e. the stroke-fluid pressure relation in a normal condition; thus there arises a necessity to discharge fluid from the static pressure line by an amount corresponding to the amount of fluid supplied from the dynamic pressure line while the pedal is pushed forward. The fluid may be discharged through the antilock control valves 14 into the reservoir 6. But for easier control, it should be discharged through the pressure control valve 4 after directing it into the dynamic pressure line.

In this embodiment, the above four cases (a) to (d) can be attained simply by connecting the dynamic pressure line and the static pressure line through a passage 29 and providing in parallel a solenoid changeover valve 30 and a pressure-responsive changeover valve 32 having a built-in check valve 31 in the passage 29. The check valve may be provided independently of the valve 32 so as to be positioned parallel to the valve 30 and connected to the valve 32 in series.

In this arrangement, the solenoid changeover valve 30 opens only if the electronic control unit 3 is judged to be in the antilock control mode or the deceleration is judged to be too large compared with the pedal stroke.

On the other hand, the pressure-responsive changeover valve 32 opens only if the pressure in the static pressure line exceeds a predetermined valve.

With this arrangement, in the case (a), that is, if the dynamic pressure line should fail, the antilock control is prohibited. Since in this situation the effect of shortening of the pedal stroke is lost and thus the stroke is excessively large compared with the deceleration, the changeover valve 30 will be closed whereas a circuit in parallel to the valve 30 will be closed by the check valve 31, thus preventing the leakage of fluid from the static pressure line to the dynamic pressure line.

In the case (b), i.e. if the static pressure line should fail, there is no fear of the wheels in the static pressure line getting locked (no antilock function operates). In this state, the changeover valve 30 is closed because the pedal stroke is too large. The valve 32 is also closed because the pressure in the static pressure line is kept from rising. Thus the passage 29 is closed completely.

In the cases (c) and (d), the changeover valve 30 is opened to permit a fluid flow from the dynamic pressure line to the static pressure line in the case (c) and a back flow from the static pressure line to the dynamic pressure line in the case (d).

The structure of this embodiment has one advantage that it can cope with all the cases (a) to (d). But it is possible to omit the valve 32 having the check valve 31 or to omit the valve 30 while leaving the valves 31 and 32, if desired from an economical standpoint. But it should be noted that the control algorithm required for the electronic control unit would be complicated if they are omitted.

In order to supply fluid from the dynamic pressure line as shown in the drawing, it is necessary to detect malfunction in the dynamic pressure line and prohibit the antilock control valves 14 from getting actuated. If the control valve 30 is provided, it has to be prohibited from getting actuated, too. The simplest way to detect malfunction in the dynamic pressure line is to provide a pressure switch for alarming low pressure in the dynamic pressure source 5.

Another way for prohibiting actuation is to provide a pressure-responsive changeover valve in parallel with the changeover valve 30 so as to close this valve if the pressure in the dynamic pressure source gets lower than a predetermined value. In this case, it is necessary to provide a similar pressure-responsive valve in the passage extending from the antilock control valves 14 to the reservoir 6, too.

Also the electronic control unit 3 may be used to determined the timing for prohibiting actuation so as to issue a prohibiting command. This is possible because while the dynamic pressure line is malfunctioning, the pedal stroke becomes too large and the deceleration becomes too small before the antilock control starts, and because the dynamic pressure line shows no locking tendency while the static pressure line does.

In FIG. 2, numeral 18 designates a limit valve as described in FIG. 1. The limit valve 18 in this embodiment can be used for antilock control. Namely, if the pedal is pushed forward by an excessive treading force while the dynamic pressure source is normal and thus the push rod 8 directly pushes the dynamic pressure piston 9, the wheels in the static pressure line will lock because the pressure therein is excessively large. Thus it is desirable not to prohibit pressure reduction during antilock control. But it is essential to replenish fluid in order to prevent increase in the pedal stroke. If however the pressure in the static pressure line is higher than the pressure in the dynamic pressure line, no supplement of fluid is possible. The limit valve 18 serves to prevent any abnormal rise in the pressure in the static pressure line downsteam of the limit valve and thus prevent such a problem.

In the description of this embodiment, any separating or connecting means which are necessary to assemble the device are omitted so as to facilitate understanding of the characterizing parts of the structure of this embodiment.

The master cylinder and the booster valve mechanism employed in this embodiment is a mere example. Any other known method may be used.

It is of course possible to supply fluid into the static pressure line of a device having no ordiary pure mechanical fluid pressure booster mechanism from the dynamic pressure line in the manner shown in FIG. 2.

What is claimed is:

1. An electronically controlled brake device for electronically controlling brake pressure according to a manual control input, comprising:
   a manual control input end having manual input means;
   a control input stroke sensor for detecting the displacement of said manual control input end;
   a dynamic pressure source;
   a reservoir;
   a dynamic pressure chamber;
   an electronic control unit for producing pressure control commands on the basis of sensor information including the information from said control input stroke sensor;
   an electronic pressure control valve operable in response to the commands from said electronic control unit to control the communication of said dynamic pressure chamber with said dynamic pressure source and with said reservoir to control the fluid pressure in said dynamic pressure chamber and to supply the output pressure of said electronic pressure control valve to said dynamic pressure chamber as input pressure to said dynamic pressure chamber;
   a dynamic pressure piston adapted to be driven under the input pressure to said dynamic pressure chamber supplied through said pressure control valve;
   a master cylinder operative in response to the movement of said dynamic pressure piston to supply static pressure to at least one brake circuit; and
   a push rod coupled with said manual control input end at one end thereof and adapted to be exposed to the pressure in said dynamic pressure chamber with a smaller exposure area than that of said dynamic pressure piston at the other end thereof;
   whereby, while the dynamic pressure line is functioning normally, said push rod is kept apart from said dynamic pressure piston, giving to said manual control input end a reaction force proportional to the pressure in said dynamic pressure chamber and a stroke shorter than that of said dynamic pressure piston, and if the dynamic pressure line should fail, said push rod comes into contact with said dynamic pressure piston, giving to said manual control input end a reaction force and a stroke equal to those of said dynamic pressure piston generated by the static brake circuit.

2. An electronically controlled brake device as claimed in claim 1, wherein said electronic control unit has a function of estimating the acceleration or deceleration of the vehicle from the output of a vehicle acceleration/deceleration sensor or a wheel speed sensor, comparing the results with a target deceleration determined so as to be in a predetermined relationship with the control input stroke, and controlling the device so as to give a predetermined acceleration or deceleration with respect to the stroke detected by said control input stroke sensor.

3. An electronically controlled brake device as claimed in claim 1, wherein the member coupled with said control input end is provided with a return restricting stopper so that while the manual control input is zero, said electronic control unit controls the pressure control valve based at least on the information from said wheel speed sensor to produce a dynamic pressure and a static pressure necessary for automatic braking.

4. An electronically controlled brake device as claimed in any of claim 1 to 3, further comprising individual wheel control means capable of antilock control, said control means being provided in the static pressure line so as to be fluidly separated from the dynamic pressure line.

5. An electronically controlled brake device as claimed in any of claims 1 to 3, further comprising individual wheel control means capable of antilock control, said control means being provided in the static pressure line to discharge an excess of brake fluid back into the reservoir during a pressure reduction phase and to receive brake fluid from the dynamic pressure line during the pressure re-increase phase.

6. An electronically controlled brake device as claimed in claim 5, wherein the static pressure line and the dynamic pressure line are connected together through a channel having a changeover valve adapted to be opened only if said electronic control unit judges that the system is in the antilock control mode or the deceleration is excessively large compared with the pedal stroke.

7. An electronically controlled brake device as claimed in claim 5, wherein the static pressure line and the dynamic pressure line being connected together through a channel having a changeover valve adapted to be opened only if the pressure in the static pressure line exceeds a predetermined value and a check valve provided internally or externally in series of said changeover valve to prevent fluid from flowing from the static pressure line to the dynamic pressure line.

8. An electronically controlled brake device as claimed in claim 5, wherein the static pressure line and the dynamic pressure line are connected together through a channel having a changeover valve adapted to be opened only if said electronic control unit judges that the system is in the antilock control mode or the deceleration is excessively large compared with the pedal stroke and a changeover valve adapted to be opened only if the pressure in the static pressure line exceeds a predetermined value coupled with a check valve provided internally or externally in series with said changeover valve so as to prevent fluid from flowing from the static pressure line to the dynamic pressure line, the two aforesaid changeover valves being connected in parallel.

9. An electronically controlled brake device as claimed in any of claims 1, 2 or 3, wherein a single master cylinder is provided to supply the static pressure to a first line of a two-line brake system and the dynamic pressure to a second line.

10. An electronically controlled brake device as claimed in any of claims 1, 2 or 3, wherein said master cylinder is in the form of a tandem master cylinder, whereby supplying its respective static pressure to said first and second lines of a two-line brake system separately and using the dynamic pressure as a boost pressure to boost up the pressure of the static pressure line.

11. An electronically controlled brake device as claimed in any of claims 1, 2 or 3, wherein said master cylinder is a tandem master cylinder and said brake device is a three-line brake system comprising two static pressure lines and one dynamic pressure line.

12. An electronically controlled brake device as claimed in any of claims 1, 2 or 3, further comprising a mechanical valve mechanism for opening and closing the communication of said dynamic pressure chamber with said electronic pressure control valve and with said dynamic pressure source according to the relative movement between said push rod and said dynamic pressure piston.

13. An electronically controlled brake device as claimed in any of claims 1, 2 or 3, further comprising a limit valve adapted to close the channel if the pressure in the static pressure line exceeds a predetermined value lower than the lower limit of the normally functioning dynamic pressure source.

14. An electronically controlled brake device as claimed in claim 6, wherein a single master cylinder is provided to supply the static pressure to a first line of a two-line brake system and the dynamic pressure to a second line.

15. An electronically controlled brake device as claimed in claim 7, wherein a single master cylinder is provided to supply the static pressure to a first line of a two-line brake system and the dynamic pressure to a second line.

16. An electronically controlled brake device as claimed in claim 8, wherein a single master cylinder is provided to supply the static pressure to a first line of a two-line brake system and the dynamic pressure to a second line.

17. An electronically controlled brake device as claimed in claim 6, wherein said master cylinder is in the form of a tandem master cylinder, whereby supplying its respective static pressure to said first and second lines of a two-line brake system separately and using the dynamic pressure as a boost pressure to boost up the pressure of the static pressure line.

18. An electronically controlled brake device as claimed in claim 7, wherein said master cylinder is in the form of a tandem master cylinder, whereby supplying its respective static pressure to said first and second lines of a two-line brake system separately and using the dynamic pressure as a boost pressure to boost up the pressure of the static pressure line.

19. An electronically controlled brake device as claimed in claim 8, wherein said master cylinder is in the form of a tandem master cylinder, whereby supplying its respective static pressure to said first and second lines of a two-line brake system separately and using the dynamic pressure as a boost pressure to boost up the pressure of the static pressure line.

20. An electronically controlled brake device as claimed in claim 6, wherein said master cylinder is a tandem master cylinder and said brake device is a three-line brake system comprising two static pressure lines and one dynamic pressure line.

21. An electronically controlled brake device as claimed in claim 7, wherein said master cylinder is a tandem master cylinder and said brake device is a three-line brake system comprising two static pressure lines and one dynamic pressure line.

22. An electronically controlled brake device as claimed in claim 8, wherein said master cylinder is a tandem master cylinder and said brake device is a three-line brake system comprising two static pressure lines and one dynamic pressure line.

23. An electronically controlled brake device as claimed in claim 6, further comprising a mechanical valve mechanism for opening and closing the communication of said dynamic pressure chamber with said electronic pressure control valve and with said dynamic pressure source according to the relative movement between said push rod and said dynamic pressure piston.

24. An electronically controlled brake device as claimed in claim 7, further comprising a mechanical valve mechanism for opening and closing the communication of said dynamic pressure chamber with said electronic pressure control valve and with said dynamic pressure source according to the relative movement between said push rod and said dynamic pressure piston.

25. An electronically controlled brake device as claimed in claim 8, further comprising a mechanical valve mechanism for opening and closing the communication of said dynamic pressure chamber with said electronic pressure control valve and with said dynamic pressure source according to the relative movement between said push rod and said dynamic pressure piston.

26. An electronically controlled brake device as claimed in claim 6, further comprising a limit valve adapted to close the channel if the pressure in the static pressure line exceeds a predetermined value lower than the lower limit of the normally functioning dynamic pressure source.

27. An electronically controlled brake device as claimed n claim 7, further comprising a limit valve adapted to close the channel if the pressure in the static pressure line exceeds a predetermined value lower than the lower limit of the normally functioning dynamic pressure source.

28. An electronically controlled brake device as claimed in claim 8, further comprising a limit valve adapted to close the channel if the pressure in the static pressure line exceeds a predetermined value lower than the lower limit of the normally functioning dynamic pressure source.

* * * * *